Sept. 21, 1937.  D. E. AUSTIN  2,093,859
VEHICLE BODY
Filed Feb. 17, 1936  2 Sheets-Sheet 1
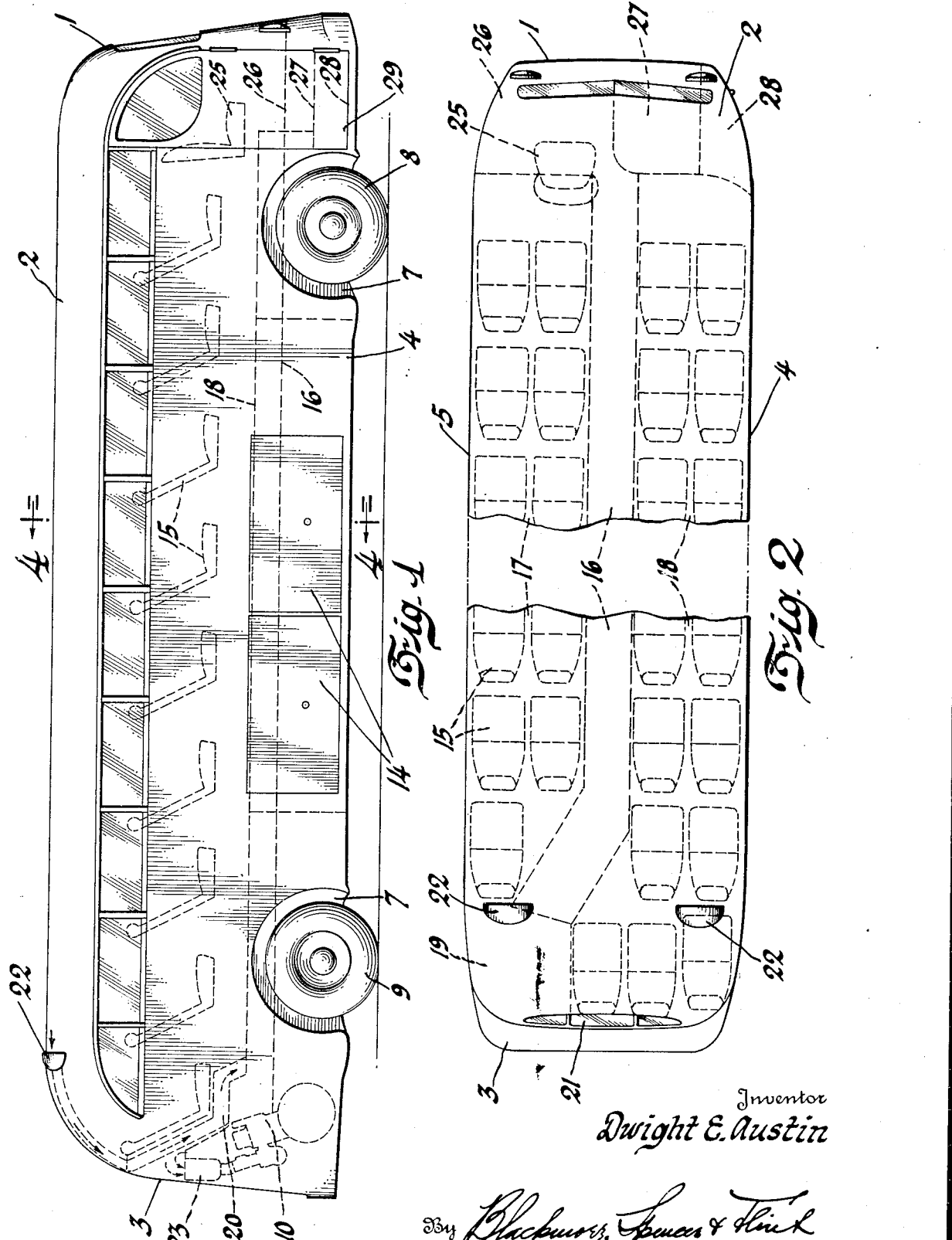

Sept. 21, 1937.      D. E. AUSTIN      2,093,859
VEHICLE BODY
Filed Feb. 17, 1936      2 Sheets-Sheet 2
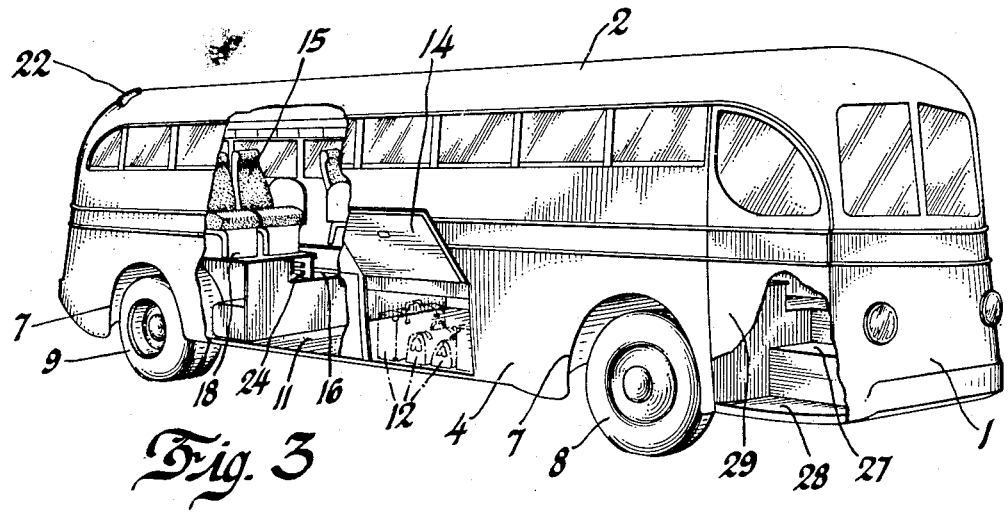
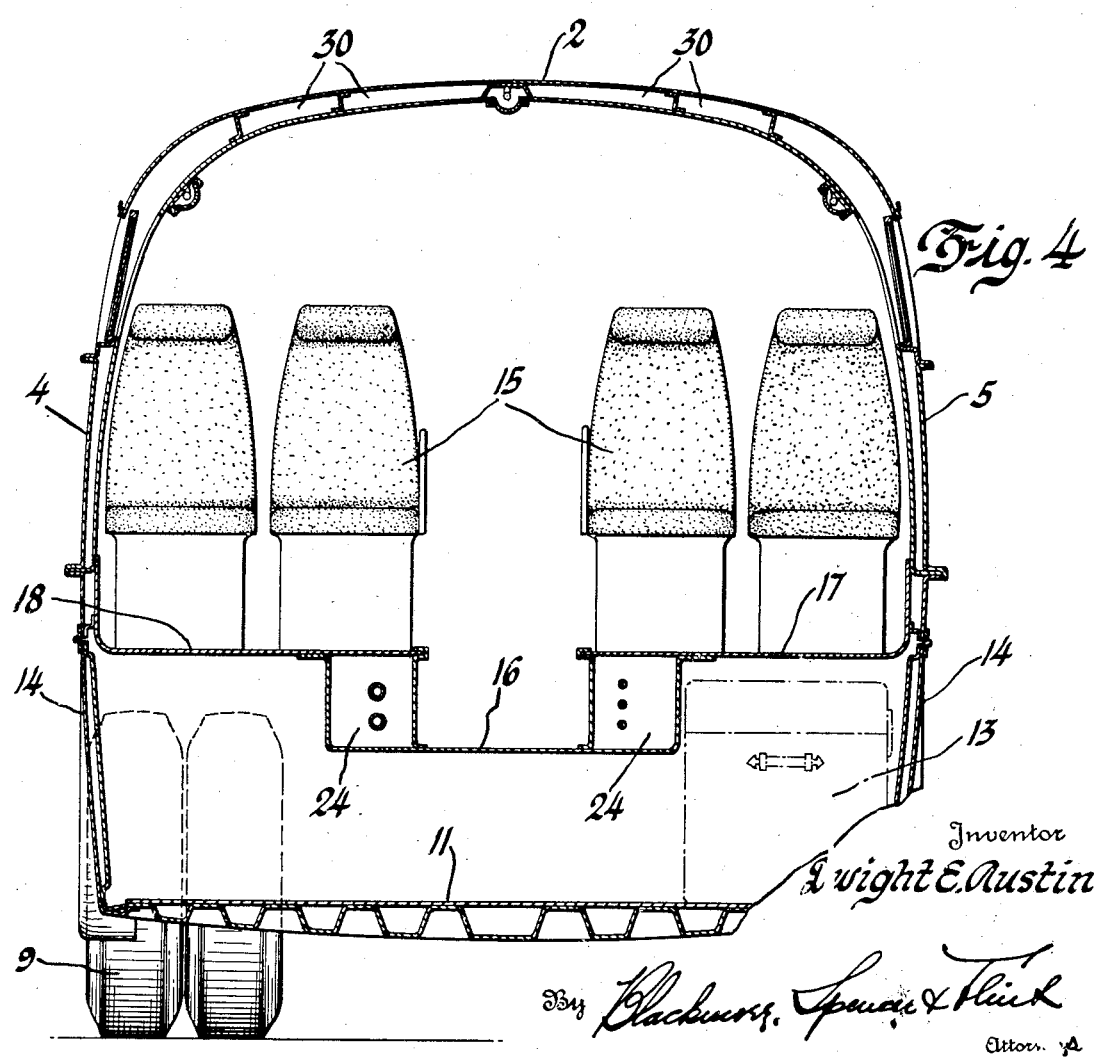

Patented Sept. 21, 1937

2,093,859

UNITED STATES PATENT OFFICE 2,093,859

VEHICLE BODY

Dwight E. Austin, Pontiac, Mich., assignor, by mesne assignments, to Yellow Truck and Coach Manufacturing Company, Pontiac, Mich., a corporation of Maine Application February 17, 1936, Serial No. 64,255

5 Claims. (Cl. 296—28)

This invention relates to motor driven passenger coaches or buses, and its primary object is to provide an improved road vehicle, particularly adapted for intercity use or the long distance transportation of fares.

Such vehicles as generally constructed heretofore, involve a body resting on a chassis frame which is spring supported above the front and rear axles, and because the wheels are necessarily of large diameter the wheel housings project some distance above the floor. These projected wheel housings break up the floor plan, waste pay load space and call for awkward and uncomfortable seating arrangements. Passenger baggage usually is stored overhead and sometimes on the roof with only a canvas covering or within built-in storage enclosures that offer too little protection against the elements, and the use of a ladder to climb onto the roof is needed to reach the inaccessible load space.

Without increasing overhead height or raising the center of gravity as compared with former designs, it is here proposed to construct a vehicle in which passenger carrying decks are provided along each side wall on a plane above the wheel housings, with readily accessible and tightly closed baggage compartments beneath the passenger compartment and between the wheel housings. This eliminates bulky wheel housings within the passenger carrying space and affords an unobstructed and better appearing interior of uniform width throughout and a flat floor extending on a straight line from end to end for the most advantageous grouping of seats. The slightly higher level of the passenger seats imparts to the occupant of a mass transportation vehicle a sense of security, and in fact is a safety factor in the event of collision because in most cases the impact will be below and out of line with the region of the passenger compartment. Additionally the loading and unloading of cumbersome baggage is greatly simplified, especially when this must be done on the road between station stops.

The raised floor also provides an abundance of space beyond the rear wheel housings for the power plant of the vehicle and neither the engine nor the drive connections to the wheels interfere or occupy space useful for the pay load. That portion of the vehicle overhanging the forward wheels is utilized as a station for the vehicle operator and also for the entrance to the passenger compartment. The entrance includes a door opening in the side wall, a step at about curb height, and a loading platform one step up.

Leading rearwardly and one step up from the loading platform is a central aisle consisting of a depressed channel in the floor of the passenger compartment and between the passenger seating decks along opposite side walls. Thus the passenger boarding the vehicle from street level rises four steps to reach a seat on the raised passenger carrying deck and only three steps up if he boards from the curb, but in either event there are no steep stairs to climb and the ascent is made in gradual stages and without particular notice, especially when there is a momentary delay on the loading platform for collection of fare.

The collection of fare is somewhat facilitated by seating the operator at a convenient height with reference to passengers standing on the loading platform, and for this purpose the operator station at the side of the vehicle opposite the entrance opening is on a floor raised above the loading platform and on the level of the depressed central aisle. Because of the depressed central aisle ample headroom is provided for the movement of passengers to and from the seats on the raised decks and since the passengers sit at a higher level than the operator the position of the operator is out of their direct line of forward vision for an unobstructed view of the road ahead. Furthermore, the driving controls are largely out of sight and this eliminates mental fatigue for those passengers who have a tendency to concentrate attention on and assist mentally in the operator's actions of manipulating the controls. These several things combine to make for greater passenger comfort and overcome many disturbing problems of mass transportation by motor vehicle, particularly as regards maximum seating capacity, the rapid handling of passengers entering or leaving the vehicle, and a general reduction in the burden of an operator.

A better understanding of the detail structure will be had upon reference to the accompanying drawings wherein Figure 1 is a side elevation showing my improved vehicle; Figure 2 shows a fragment of the vehicle in plan view; Figure 3 is a perspective with parts broken away, and Figure 4 is a sectional view taken on line 4—4 of Figure 1.

In the drawings the vehicle is illustrated as having a box-like type of body and is devoid of the usual chassis frame. It includes a front wall 1, a roof 2, a rear wall 3 and side walls 4 and 5. In spaced relation to the front and rear walls 1 and 3, the side walls 4 and 5 are each provided with indented wheel housings 7 so that both the front or steering wheels 8 and the rear or driving wheels 9 are located within the over-all width and length of the vehicle.

Beyond the rear wheels 9 the body houses a power plant which may include an internal combustion engine 10 having suitable drive connections with the wheels. In the space between the forward and rearward wheel housings, the underneath of the body is closed by a bottom wall or flooring 11 extending across and between the side walls. This provides an abundance of floor space for luggage, such as the handgrips 12 or the trunk 13, and the space is readily accessible through openings in each side wall adapted to be closed by one or more swinging doors 14 which should be so constructed as to provide a sealed enclosure to exclude dirt and moisture.

Intermediate the bottom flooring 11 and the roof 2 is a drop center flooring or partition which divides the interior of the vehicle horizontally into superposed compartments, the lowermost of which affords an enclosure for the baggage as heretofore referred to. Above the flooring is the space for passenger occupancy, and during travel the passengers will be seated upon suitable chairs preferably of the adjustable reclining type, as indicated at 15 on both sides of the centrally depressed aisle 16. The passenger seats are located above and are supported upon the raised passenger carrying decks 17 and 18 so that the feet and other parts of the body are located wholly beyond the central aisle, and the decks along each side wall lie above the tops of the wheel housings and extend on straight lines from end to end. This flat flooring without bulky obstructions enables the chairs to be mounted thereon in any convenient grouping which is found best for the utilization of available space, and the arrangement of the depressed central aisle located between the transversely spaced wheel housings affords ample headroom for persons of normal stature without increasing overall vehicle height. At the rear of the vehicle the aisle may extend obliquely, as seen in Figure 2, for communication with a compartment 19 located in the corner of the vehicle and usable as a washroom or lavatory. In this event the deck 18 will be widened at the rear for the accommodation of an extra seat immediately forward of the rear wall 3.

For insulating the engine compartment from the passenger compartment, and additionally to provide a conduit for clean air free from road dust, a double wall may be provided immediately behind the rearmost seats and which affords a conduit 20. This conduit 20 leads downwardly on opposite sides of the rear window 21 from a pair of scoops 22 in the roof of the vehicle and air caught by the scoops on the forward motion of the vehicle passes downwardly to the bottom of each side conduit and then inwardly to an upwardly extending similarly formed passage in the middle of the rear wall and under the windows 21 and which opens rearwardly into the engine compartment near the top thereof. This air flow will give some ventilation to the engine compartment but more particularly will furnish a supply of clean air for the fuel mixture on which the engine is to be operated. As an additional safeguard against the admission of dust, the engine intake may be provided with an air cleaner, as shown at 23, to which the supply leads as indicated by the arrows in Figure 1.

A double wall structure is used also in the roof and side walls, not only for the purpose of reinforcement, but for heat insulation or the like. In the case of the hollow space in the roof this may, if desired, be divided into a transverse succession of passages 30, as seen in the sectional view, Figure 4, and these passages can be used as a part of a ventilating system in which fresh air is conducted through certain of the passages and directed through suitable openings into the interior of the vehicle while other of the passages are for the ejection of foul air.

Additional passages for ventilation or other uses may be provided conveniently as shown at 24 on opposite sides of the aisle 16 and these longitudinally extending passages can be used also to house or enclose electric wiring, fluid pressure conduits, or operating gear for controlling the rearwardly located vehicle drive mechanism from the operator's station in the front of the vehicle.

The operator's station may include a seat 25 on a level slightly lower than the level of the seats to be occupied by passengers, and a platform or floor 26 on a level with the central aisle 16, but offset therefrom and extending to one side wall. Projecting laterally from the operator's station and at a level one step down is the loading platform 27 and the loading platform terminates in a depressed step 28 immediately adjacent the entrance opening in the side wall opposite and in transverse alinement with the operator's station. A hinged or swinging door 29 under control of the operator, allows fares to enter or leave the vehicle.

Upon entering the coach, the passenger reaches the loading platform 27 beside the driver and finds himself facing the seated driver on a convenient level for the exchange of fare. He may then step up into the aisle 16 and move back at ease to seat himself comfortably in a selected chair on one of the raised decks. In the seated position less headroom is needed, and therefore, the decks can be closer to the roof than the depressed aisle, and with the depressed aisle for passengers standing erect, the decks can be located above the indented wheel housings and the baggage compartment, without making the vehicle any higher than a conventional coach having provision for overhead storage of luggage.

I claim:

1. A vehicle body including top, bottom and side walls, forward and rearward wheel housings indented in each side wall, a partition extending horizontally between the side walls above the upper limits of said wheel housings and forming the floor of a passenger compartment, a baggage compartment below the same, chairs supported in said passenger compartment upon said partition along both side walls, a depressed aisle extending between said chairs and forming a part of said partition, an operator's platform forward of the forward wheel housing on the level of said depressed aisle and adjacent one side wall and steps leading from the aisle to an entrance opening in the side wall opposite to the operator's platform, whereby an enlarged and unobstructed passenger compartment is obtained without unduly increasing height or raising the center of gravity of the vehicle.

2. A vehicle of the class described, including a box-like body having forward and rearward wheel housings indented in the side walls in spaced relation to the front and rear walls, a floor providing unbroken single level decks along the side walls at a height clearing the tops of the forward and rearward wheel housings and a depressd central aisle between the decks, a driver's station between the front wall and the indented forward wheel housing in one side wall on a floor level at the height of the central aisle, a loading platform ahead of the forward indented wheel housing at a height one step down from the level of the central aisle, an entrance step within the body and below said loading platform and an entrance door closing against said step, whereby a conveniently accessible, enlarged and unobstructed passenger compartment is provided without unduly increasing the height of the vehicle.

3. In a motor vehicle, a box-like body having forward and rearward wheel housings indented in the side walls, a horizontal drop center partition extending transversely between the side walls above the tops of said wheel housings affording a depressed center aisle, a floor extending transversely between and connecting the side walls in spaced relation to said drop center partition and enclosing the underside of the body between the forward and rearward wheel housings to define a baggage compartment which extends entirely across the body, whereby an enlarged and unobstructed passenger compartment is obtained without unduly increasing height or raising the center of gravity of the vehicle.

4. In a motor vehicle, a box-like body having forward and rearward wheel housings indented in the side walls, a floor closing the underside of the body between the forward and rearward wheel housings and constituting a baggage platform and a drop center partition connecting the side walls and clearing the tops of the several wheel housings and including a central panel and a pair of side panels having their adjacent marginal portions in overlapping and vertically spaced relation and transversely spaced vertical webs joining each set of overlapping portions and constituting therewith box section girders, whereby an enlarged and unobstructed passenger compartment is obtained without unduly increasing height or raising the center of gravity of the vehicle.

5. In a passenger carrying vehicle having a pair of side walls, a pair of longitudinally spaced indented wheel wells associated with each side wall, a central aisle located between the wells in the opposite side walls in a single horizontal plane below the upper limits of the wells, a raised floor deck bridging the space between the aisle and each side wall bridging the space between and extending on a continuous unbroken line over and beyond the longitudinally spaced wells in a single horizontal plane on a level above the upper limits of the wells, and passenger chairs on said raised decks, whereby an enlarged and unobstructed passenger compartment is obtained without unduly increasing the height of the vehicle.

DWIGHT E. AUSTIN.